Patented Oct. 25, 1932

1,884,038

UNITED STATES PATENT OFFICE

GEORGE JAMES MANSON, OF HAWKESBURY, ONTARIO, CANADA, ASSIGNOR, BY MESNE ASSIGNMENTS, TO MANSONS CHEMICAL COMPANY, OF MONTCLAIR, NEW JERSEY, A CORPORATION OF NEW JERSEY

WATERPROOFED FIBROUS PRODUCT

No Drawing. Original application filed July 8, 1926, Serial No. 121,260. Divided and this application filed April 25, 1927. Serial No. 186,602.

This invention relates to improvements in water proofed fibrous products, such as paper or fiber board, and the objects of the invention are to provide such a product as may be manufactured at low cost and without disturbance of the usual technical process by which the paper, fiber board or the like is manufactured.

This is accomplished by the use of an improved water proofing agent produced in the manner described in my co-pending application Serial No. 121,260, filed July 8th 1926, of which the present application is a division.

The water repellant substance relied upon for water proofing is preferably introduced into the fibrous stock in the form of an emulsion.

It is desirable in the formation of emulsions that the emulsifying medium, or the medium which is relied upon to facilitate dispersion of the wax or other water repellant substance should be in as finely divided a state as possible in order to facilitate the coating of the minute particles of the wax or the like with the said substance. I have found that if the emulsifying medium, instead of being a pre-formed material such as finely divided clay, is produced by precipitation during the process of emulsification or dispersion, then a much greater degree of fineness may be produced with corresponding improvement in the final product.

Such a precipitate may be formed from a variety of electrolytes or combinations of electrolytes by reaction therewith of other suitable electrolytes to form a finely divided precipitate, the dispersion of the water repellant substance being caused to take place simultaneously with the emulsification.

The invention is applicable to a variety of water repellant substances which may be selected according to the use in which they are to be applied. Such water repellant substance may, for instance, be any natural or synthetic oil, fat, resin, bitumen or wax, or any other suitable combination of these. Convenient materials to use are resin, pitch, tar or wax.

With certain of the water repellant substances it may be found advisable to add a small quantity of any well known emulsifying agent.

I have found that electrolytes such as magnesium chloride, magnesium sulphate, aluminum sulphate, sodium chloride, hydrochloric acid, sulphuric acid, organic or inorganic acids used separately or together with such electrolytes as sodium hydroxide, calcium hydroxide, ammonia and sodium carbonate, give a suitable encysting precipitate.

In practicing the method, the wax or other water repellant material is melted and mixed with water containing in solution one or more of the above mentioned electrolytes. An electrolyte or electrolytes which will give a precipitate with the first electrolyte is then added and the mixture stirred while the precipitate is being formed, the temperature being maintained above the melting point of the wax or other water repellant substance, whereby the encysting precipitate will form a coating about the individual particles of wax or other water repellant substance to maintain them in discrete form and prevent them from coalescing when the mixture cools.

The following will serve as examples of practically carrying out the process:

*Example I.*—150 pounds of montan wax are melted; into this is poured 150 pounds of water containing in solution 9 pounds of sodium carbonate, the solution of the sodium carbonate having a temperature of about 10° above the melting point of montan wax, the melted montan wax and solution of magnesium chloride is then rapidly stirred and a solution of 14 pounds of magnesium chloride dissolved in 75 pounds of water is added, whereby a finely divided precipitate of magnesium carbonate is formed which coats the particles of montan wax and maintains them in discrete form, preventing them from fusing together when the mixture cools.

*Example II.*—19% of montan wax; 18% of paraffin wax; 1.7% of unslaked lime —plus— (65% of the total water); 4.6% of alum, —plus— (35% of the total water).

The melted wax is put in the mixer and the milk of lime added. After 1 minute agitation the alum solution is added and agitated for two minutes when it is dumped. Working temperature 170° F.

It will be found that this dispersion mixture can be indefinitely diluted with water to any desirable stage of dilution appropriate to the purpose in hand.

In using the above described mixture or emulsion, for example to waterproof paper, the mixture may be added to the beater with or without other sizing agents and with our without a coagulating agent such as alum, these agents being added in such a way as to establish a proper pH value in accordance with the practice of the art. A similar method may be employed to waterproofing of fiber board or other material produced from a fibrous stock. Alum, for instance, may be added to complete any coagulating effect required. Owing to the peculiar modifying qualities of the encasing or encysting mineral precipitate on the wax particle (which may be attributed to the method of forming the wax dispersion) so great a proportion of alum as is customarily employed with, for example, resin size, need not be used in the practice of the preferred form of the present invention.

As many changes could be made in the above process and many apparently widely different embodiments of my invention, within the scope of the claims, constructed without departing from the spirit or scope thereof, it is intended that all matter contained in the accompanying specification shall be interpreted as illustrative and not in a limiting sense.

The methods of forming fibrous pulp containing dispersions of water-repellant material encased in an encysting precipitate formed during the dispersion of the water-repellant substance, are described and claimed in my companion copending application, Serial No. 186,600, filed April 25, 1927.

What I claim as my invention is:

1. A fibrous product made from a pulp carrying a dispersion of encysted water-repellant substance.

2. As a new article of manufacture, a fibrous product produced from a pulp incorporated with a dispersion of a water-repellant substance simultaneously dispersed in an aqueous medium while encysting said water-repellant substance with a precipitate formed by double decomposition.

3. As a new article of manufacture, a fibrous product produced from a pulp incorporated with a dispersion of a wax simultaneously dispersed in an aqueous medium while encysting said wax with a precipitate formed by double decomposition.

4. As a new article of manufacture, a fibrous product produced from a pulp incorporated with a dispersion of a water-repellant substance simultaneously dispersed in an aqueous medium while encysting said water-repellant substance with a precipitate formed by double decomposition, and coagulated within the pulp.

In witness whereof I have hereunto set my hand.

GEORGE JAMES MANSON.

CERTIFICATE OF CORRECTION.

Patent No. 1,884,038. October 25, 1932.

GEORGE JAMES MANSON.

It is hereby certified that the name of the assignee in the above numbered patent was erroneously described and specified as "Mansons Chemical Company", whereas said name should have been described and specified as "Manson Chemical Company"; and that the said Letters Patent should be read with this correction therein that the same may conform to the record of the case in the Patent Office.

Signed and sealed this 18th day of July, A. D. 1933.

M. J. Moore.

(Seal)

Acting Commissioner of Patents.

CERTIFICATE OF CORRECTION.

Patent No. 1,884,038.  October 25, 1932.

GEORGE JAMES MANSON.

It is hereby certified that the name of the assignee in the above numbered patent was erroneously described and specified as "Mansons Chemical Company", whereas said name should have been described and specified as "Manson Chemical Company"; and that the said Letters Patent should be read with this correction therein that the same may conform to the record of the case in the Patent Office.

Signed and sealed this 18th day of July, A. D. 1933.

M. J. Moore.

(Seal) Acting Commissioner of Patents.